May 10, 1960 H. L. YAGER 2,936,150
MOUNTING BRACKET FOR AN AUTOMOBILE PARKING BUMPER
Filed Feb. 11, 1957

INVENTOR.
HARRY L. YAGER
BY
Buckhorn, Cheatham + Blore
ATTORNEYS

United States Patent Office 2,936,150
Patented May 10, 1960

2,936,150

MOUNTING BRACKET FOR AN AUTOMOBILE PARKING BUMPER

Harry L. Yager, Portland, Oreg., assignor to Northwest Tube & Metal Fabricators, Portland, Oreg., a corporation of Oregon Application February 11, 1957, Serial No. 639,389

1 Claim. (Cl. 248—316)

My present invention comprises a mounting bracket for an automobile parking bumper. The purpose of the present invention is to provide means for mounting a bumper in a parking lot, garage, or other area where automobiles are parked, to prevent damage to the automobile being parked and others previously parked, or to garage walls or other structures. This is of particular importance with modern automobiles having the front or rear of the body overhanging the wheels to a great distance.

A principal object of the present invention is to provide a simple form of parking bumper bracket which may be easily installed and is adapted to mount wooden beams or metal pipes, either of which may vary greatly in cross section.

A further object is to provide such a construction in which there is absolutely no necessity for drilling holes or otherwise closely shaping the beam or pipe being mounted.

A further object of the present invention is to provide such a construction in which the beam or other type of bumper bar is elevated above the ground so as to eliminate a source of dry rot of wooden beams or a source of rusting of metal pipes, and so as to permit clean sweeping or washing of the parking area.

A further object of the present invention is to provide such a construction in which the bumper bar may be readily removed for replacement, painting or repairs.

A further object of the present invention is to provide such a construction in which there are no sharp points or corners to engage the tires of a vehicle being parked and possibly puncture the same.

The objects and advantages of the present invention may be more readily understood by reference to the accompanying drawings, taken in connection with the following specification, wherein like numerals refer to like parts throughout.

Figure 1:
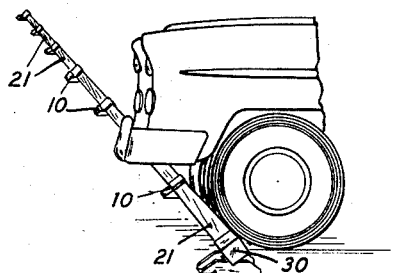
Fig. 1 is a view in perspective of a plurality of the brackets of the present invention mounting a plurality of beams to form an elongated barrier.
Figure 3:
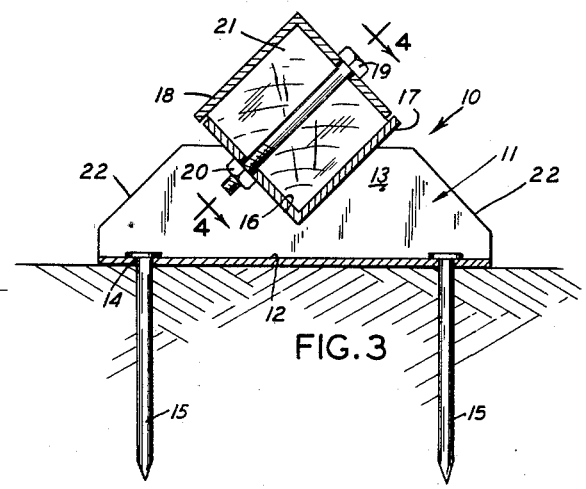
Fig. 3 is a vertical section taken substantially along line 3—3 of Fig. 2, on a greatly enlarged scale.
Figure 2:
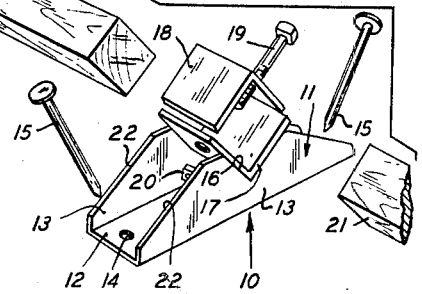
Fig. 2 is a similar view, partly exploded, on a larger scale.
Figures 4, 6:
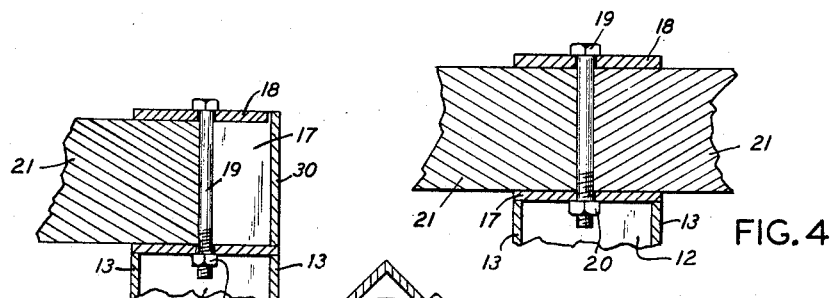
Fig. 4 is a partial section taken substantially along line 4—4 of Fig. 3.
Fig. 6 is a view similar to Fig. 4, taken through the end bracket illustrated in Fig. 5.

In the form of the invention illustrated in Figs. 2, 3, and 4, the mounting bracket 10 comprises a channel bar 11, including a web 12 adapted to be secured to the ground and a pair of upright flanges 13. The web is provided with at least one perforation 14 at each end for the reception of suitable fastening means, such as elongated spikes 15 which may be driven into the ground or macadamized area to hold the bracket in position. It is to be appreciated that the bracket may be held in place by other means such as pre-set bolts passing through the openings and retained by nuts engaging the web.

Each flange 13 is provided with a notch 16 which, in the form illustrated, is a V-shaped notch defining an angle of substantially 90°. The notches are symmetrically located so as to be bisected by a transverse vertical plane passing through the midpoint of the channel bar. A first trough member in the form of an angle bar 17 is mounted in the notches, with the end edges thereof welded to the flanges 13 along the sides of the notches 16. A second trough member in the form of an angle bar 18 of substantially the same length is mounted in inverted position above the first angle bar so as to define therewith a rectangular, transverse beam holder. A first pair of opposed legs of the bars 17 and 18 are provided with openings through which a bolt 19 extends diagonally downward to hold the second angle bar in position with respect to the first angle bar. The head of the bolt rests against the outer surface of one leg of the second angle bar and a nut 20 threaded onto the lower end of the bolt rests against the outer surface of the opposed leg of the first angle bar. Preferably, the openings through the legs of the angle bars, while centrally located, are slightly offset toward the free end of the legs so that the free end of each first leg terminates short of but adjacent to the plane of the second leg of the opposite angle bar. Thus the second angle bar is offset with relation to the first angle bar whereby respectively adjacent legs of the angle bars may be arranged in overlapping relation to each other with the respectively opposite legs in parallel relation to each other. By this construction the space between the angle bars may be of various dimensions, while the opposed legs remain parallel to each other, whereby rectangular beams of various dimensions may be confined between the angle bars and the said first legs may be moved freely toward one another to clamp a beam or member 21 therebetween. Thus a beam 21 is confined between a pair of the brackets, with the end faces of the beam closely adjacent the respective bolts 19. No drilling is required and the longitudinal dimension of the beam may vary within reason, or the spacing between brackets may also vary within reason. The projecting threaded end of the bolt 19 is located between the flanges 13 and pointing downwardly so that it will not endanger tires forced against the barrier. Preferably, each end of each of the flanges 13 is cut off at an acute angle. The end edges 22 thereby defined are directed toward the upper edge of the adjacent leg of the angle bar 17. The angle defined by the edges 22 and the web 12 is preferably about 45° so that tires will engage the broad surfaces of the wooden beam 21, and the upper legs of the angle bar 18, without engaging the sharp edges 22.

Figure 5:
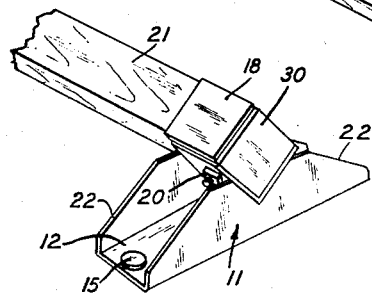
Fig. 5 is a view in perspective showing a special end bracket.

In Figs. 5 and 6, a modified form of the invention is disclosed, all details thereof being as previously illustrated except that a decorative, rectangular end cap 30 is welded to the edges of one end of the first angle bar 17. The special bracket thus formed may be used as the end of a barrier to present a more attractive appearance.

Figure 7:
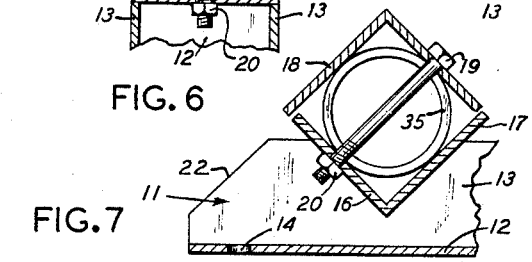
Fig. 7 is a view similar to Fig. 3 showing the bracket mounting a metal pipe.

In Fig. 7 it is seen that the bracket of the present invention will function perfectly for maintaining metal pipes 35 instead of the wooden beams 21.

It is preferred that the bottoms of the notches 16 should be spaced some distance above the web 12 so that a hose may be used to flush dirt and debris from inside of the channel bar. Also, by reason of this construction the lower edges of the beams 21, or pipes 35 as the case may be, are spaced above the ground so that brooms may be employed to sweep the surface clean, or the surface may be flushed or washed. The pipes or beams are maintained above the ground so that their lower edges will not be constantly engaged by damp surfaces which would lead to dry rot in the case of wood, or excessive rusting in the case of metal. The nuts 20 may be easily engaged by a wrench or other tool and the bolts 19 turned with respect thereto to permit separation of the upper angle bar of one or more brackets from its corresponding lower angle bar. By thus removing one upper angle bar and loosening the next adjacent upper angle bar, any section may be removed for replacement, straightening, or painting, as the requirement may be.

Having illustrated and described a preferred embodiment of the invention, it should be apparent to those skilled in the art that the same permits of modification in arrangement and detail. I claim as my invention all such modifications as come within the true spirit and scope of the following claim:

A mounting bracket for an automobile parking bumper comprising a channel bar having perforations through its web for reception of fastening elements by means of which the bracket may be secured to the ground with the web of the channel bar engaging the ground and the flanges thereof directed upwardly, each of said flanges having a 90° notch therein, said notches being arranged so as to be bisected by a transverse vertical plane at the midpoint of the channel bar, a first angle bar having first and second legs mounted in said notches with its end edges welded respectively to said flanges, a second angle bar having first and second legs disposed in inverted relation above said first angle bar with said first legs and said second legs respectively opposite and parallel, said first leg of each of said angle bars having a central opening therethrough, a bolt extending through said openings and having its head bearing against the outer surface of said second angle bar, and a nut threaded on said bolt and bearing against the outer surface of said first angle bar, said openings being offset in the respective angle bar first leg from the center of each such first leg toward the free end thereof so that the said free end of each first leg terminates short of but adjacent to the plane of said second leg of the other angle bar whereby said first legs may be moved freely toward one another to clamp a bumper beam therebetween.

References Cited in the file of this patent

UNITED STATES PATENTS

| | | |
|---|---|---|
| 962,219 | Hughes | June 21, 1910 |
| 2,218,016 | Anderson | Oct. 15, 1940 |
| 2,259,890 | Hipple | Oct. 21, 1941 |
| 2,550,001 | Button | Apr. 24, 1951 |
| 2,582,679 | Carroll | Jan. 15, 1952 |
| 2,655,225 | Harris | Oct. 13, 1953 |
| 2,725,958 | Porter et al. | Dec. 6, 1955 |
| 2,794,375 | D'Falco et al. | June 4, 1957 |